United States Patent
Lee

(10) Patent No.: US 12,370,985 B2
(45) Date of Patent: Jul. 29, 2025

(54) ELECTRONIC PARKING BRAKE SYSTEM AND CONTROL METHOD THEREOF

(71) Applicant: HL MANDO CORPORATION, Pyeongtaek-si (KR)

(72) Inventor: Yongwoo Lee, Anseong-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 645 days.

(21) Appl. No.: 17/122,019

(22) Filed: Dec. 15, 2020

(65) Prior Publication Data

US 2021/0188228 A1 Jun. 24, 2021

(30) Foreign Application Priority Data

Dec. 18, 2019 (KR) .......................... 10-2019-0169354

(51) Int. Cl.
*B60T 8/172* (2006.01)
*B60T 8/17* (2006.01)
*B60T 8/171* (2006.01)

(52) U.S. Cl.
CPC ............ *B60T 8/172* (2013.01); *B60T 8/1701* (2013.01); *B60T 8/171* (2013.01); *B60T 2240/00* (2013.01); *B60T 2250/00* (2013.01)

(58) Field of Classification Search
CPC ........ B60T 8/172; B60T 8/1701; B60T 8/171; B60T 2240/00; B60T 2250/00
See application file for complete search history.

(56) References Cited

U.S. PATENT DOCUMENTS

| | | | |
|---|---|---|---|
| 2009/0198427 A1* | 8/2009 | Christopher Jackson | B60T 13/662 188/1.11 R |
| 2016/0339883 A1* | 11/2016 | Kim | B60T 8/248 |
| 2019/0047528 A1* | 2/2019 | Leone | B60T 8/17551 |
| 2019/0337499 A1* | 11/2019 | Hiller | B60T 7/042 |

FOREIGN PATENT DOCUMENTS

| KR | 10-2010-0061148 A | 6/2010 |
|---|---|---|
| KR | 10-1394629 B1 | 5/2014 |
| KR | 10-1679972 B1 | 11/2016 |

OTHER PUBLICATIONS

Office Action issued on May 21, 2024 for corresponding Korean Patent Application No. 10-2019-0169354, along with English machine translation (10 pages).

* cited by examiner

*Primary Examiner* — James M McPherson
*Assistant Examiner* — Bakari Underwood
(74) *Attorney, Agent, or Firm* — Hauptman Ham, LLP

(57) ABSTRACT

An electronic parking brake system that generates a clamping force required for parking of trailer-mounted towing vehicles includes an electronic parking brake provided on at least one of front and rear wheels of the towing vehicle; and a controller configured to receive a front wheel speed, a rear wheel speed, and a longitudinal acceleration of the towing vehicle, determine whether or not the trailer is mounted based on changes in the received front wheel speed, rear wheel speed, and longitudinal acceleration when the towing vehicle passes a speed bump, and determine the clamping force required for parking according to whether or not the trailer is mounted when parking is operated, and control the electronic parking brake to generate the determined clamping force.

9 Claims, 10 Drawing Sheets

ELECTRONIC PARKING BRAKE SYSTEM AND CONTROL METHOD THEREOF

CROSS-REFERENCE TO RELATED APPLICATION(S)

This application is based on and claims priority under 35 U.S.C. § 119 to Korean Patent Application No. 10-2019-0169354, filed on Dec. 18, 2019 in the Korean Intellectual Property Office, the disclosure of which is incorporated by reference in its entirety.

BACKGROUND

1. Technical Field

Embodiments of the present disclosure relate to an electronic parking brake system and a control method thereof having an electronic parking brake operated by a motor.

2. Description of the Related Art

In general, the electronic parking brake system can generate a clamping force required for parking by a mechanical structure device inside a caliper by increasing torque generated from a motor through a reducer.

The electronic parking brake system can control the clamping force based on the vehicle's Gross Vehicle Weight (GVW).

For vehicles to which a trailer can be attached, the clamping force can be controlled based on the Gross Combined Vehicle Weight (GCVW) such as the trailer and cargo combined with the vehicle.

The electronic parking brake system cannot receive the signal given to directly determine whether the vehicle is equipped with a trailer from the Electronic Stability Control (ESC) system, which controls the driving and braking power to prevent the vehicle from slipping while driving.

Therefore, it is not possible to determine whether a trailer is installed in the past.

For this reason, even when the trailer is separated from the towing vehicle from the trailer-equipped vehicle, it generates excessive clamping force based on the maximum weight (GCVW) when the trailer is mounted, which inevitably increases manufacturing cost and decreases durability.

SUMMARY

In view of the above, it is an aspect of the present disclosure to provide an electronic parking brake system and control method thereof for varying the clamping force required for parking appropriately depending on whether or not the trailer is mounted.

In accordance with an aspect of the present disclosure, an electronic parking brake system that generates a clamping force required for parking of trailer-mounted towing vehicles includes an electronic parking brake provided on at least one of front and rear wheels of the towing vehicle; and a controller configured to receive a front wheel speed, a rear wheel speed, and a longitudinal acceleration of the towing vehicle, determine whether or not the trailer is mounted based on changes in the received front wheel speed, rear wheel speed, and longitudinal acceleration when the towing vehicle passes a speed bump, and determine the clamping force required for parking according to whether or not the trailer is mounted when parking is operated, and control the electronic parking brake to generate the determined clamping force.

The controller may be configured to determine whether a first trailer mounting condition in which disturbance occurs in at least one of the received front wheel speed and rear wheel speed within a preset time after the front and rear wheels of the towing vehicle pass through the speed bump, and determine that the trailer is mounted on the towing vehicle when the first trailer mounting condition is satisfied.

The controller may be configured to determine whether the front and rear wheels of the towing vehicle pass through the speed bump based on an interval between the time when the front wheel disturbance occurs in the received front wheel speed and the time when the rear wheel disturbance occurs in the received rear wheel speed.

The controller may be configured to determine the first trailer mounting condition is satisfied when the front wheel disturbance or the rear wheel disturbance occurs within a preset time determined based on the driving speed of the towing vehicle and the distance between the rear wheel axle and the trailer wheel axle from the time when the rear wheel disturbance occurs.

The controller may be configured to determine whether a second trailer mounting condition in which vehicle shaking based on the received longitudinal acceleration occurs in the towing vehicle within a preset time after passing the front and rear wheels of the towing vehicle through the speed bump is satisfied, and determine that the trailer is mounted on the towing vehicle when the second trailer mounting condition is satisfied.

The controller may be configured to determine whether the front and rear wheels of the towing vehicle pass through the speed bump based on an interval between the times when a plurality of vehicle shaking occurs.

The controller may be configured to determine the second trailer mounting condition is satisfied when the vehicle shaking occurs within a preset time determined based on the driving speed of the towing vehicle and the distance between the rear wheel axle of the towing vehicle and the trailer wheel axle from the point of time when vehicle shaking occurs when the rear wheel of the towing vehicle passes through the speed bump.

The controller may be configured to determine whether the first trailer mounting condition is satisfied that the disturbance occurs in at least one of the received front wheel speed and rear wheel speed within a preset time after the front and rear wheels of the towing vehicle pass through the speed bump, and determine whether the second trailer mounting condition is satisfied that the vehicle shaking based on the received longitudinal acceleration occurs in the towing vehicle within the preset time after the front and rear wheels of the towing vehicle pass through the speed bump, and determine that the trailer is mounted on the towing vehicle when both the first trailer mounting condition and the second trailer mounting condition are satisfied.

The controller may be configured to determine whether a third trailer mounting condition in which vehicle shaking based on the received longitudinal acceleration occurs when the towing vehicle stops, is satisfied, when both the first trailer mounting condition and the second trailer mounting condition are satisfied, and determine that the trailer is mounted on the towing vehicle when the third trailer mounting condition is satisfied.

In accordance with another aspect of present disclosure, A control method of an electronic parking brake system that generates a clamping force required for parking of a trailer mounted towing vehicle, may include receiving a front wheel speed, a rear wheel speed and a longitudinal acceleration of the towing vehicle, determining whether or not the trailer is mounted based on changes in the received front wheel speed, rear wheel speed, and longitudinal acceleration when the towing vehicle passes the speed bump, determining a clamping force required for parking according to whether or not the trailer is installed when parking is operated, and generating the determined clamping force by the electronic parking brake.

The trailer mounting determination may include determining that the trailer is mounted on the towing vehicle, when at least one of a first trailer mounting condition in which disturbance occurs in at least one of the received front wheel speed and rear wheel speed within a preset time after the front and rear wheels of the towing vehicle pass through the speed bump and a second trailer mounting condition in which vehicle shaking based on the received longitudinal acceleration occurs in the towing vehicle within a preset time after the front and rear wheels of the towing vehicle pass through the speed bump is satisfied.

The trailer mounting determination may include determining whether the front and rear wheels of the towing vehicle pass through the speed bump based on an interval between the time when the front wheel disturbance occurs in the received front wheel speed and the time when the rear wheel disturbance occurs in the received rear wheel speed.

The trailer mounting determination may include determining the first trailer mounting condition is satisfied when the front wheel disturbance or the rear wheel disturbance occurs within a preset time determined based on the driving speed of the towing vehicle and the distance between the rear wheel axle and the trailer wheel axle from the time when the rear wheel disturbance occurs.

The trailer mounting determination may include determining whether the front and rear wheels of the towing vehicle pass through the speed bump based on an interval between the times when a plurality of vehicle shaking occurs.

The trailer mounting determination may include determining the second trailer mounting condition is satisfied when the vehicle shaking occurs within a preset time determined based on the driving speed of the towing vehicle and the distance between the rear wheel axle of the towing vehicle and the trailer wheel axle from the point of time when vehicle shaking occurs when the rear wheel of the towing vehicle passes through the speed bump.

The trailer mounting determination may include determining whether a third trailer mounting condition in which vehicle shaking based on the received longitudinal acceleration occurs when the towing vehicle stops, is satisfied, when both the first trailer mounting condition and the second trailer mounting condition are satisfied, and determine that the trailer is mounted on the towing vehicle when the third trailer mounting condition is satisfied.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
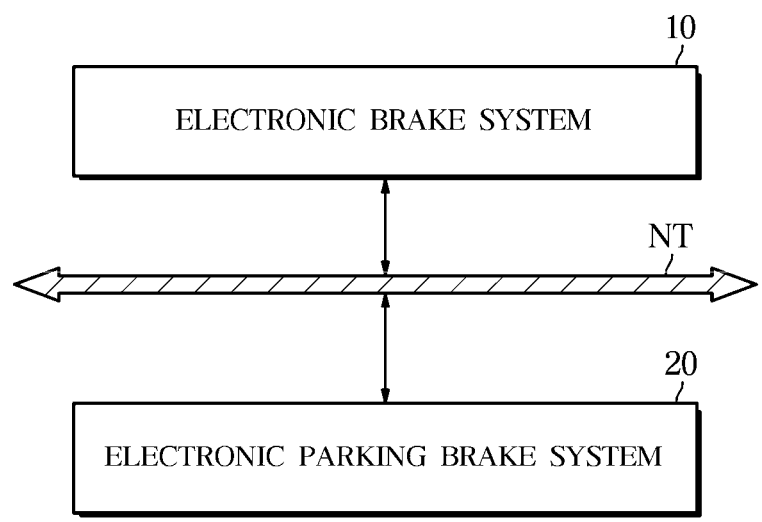
FIG. 1 illustrates a vehicle system to which an electronic parking brake system according to an embodiment is applied.

Reference will now be made in detail to the embodiments of the present disclosure, examples of which are illustrated in the accompanying drawings, wherein like reference numerals refer to like elements throughout. This specification does not describe all elements of the embodiments of the present disclosure and detailed descriptions on what are well known in the art or redundant descriptions on substantially the same configurations may be omitted. The terms 'unit, module, member, and block' used herein may be implemented using a software or hardware component. According to an embodiment, a plurality of 'units, modules, members, or blocks' may also be implemented using an element and one 'unit, module, member, or block' may include a plurality of elements.

Throughout the specification, when an element is referred to as being "connected to" another element, it may be directly or indirectly connected to the other element and the "indirectly connected to" includes being connected to the other element via a wireless communication network.

Also, it is to be understood that the terms "include" and "have" are intended to indicate the existence of elements disclosed in the specification, and are not intended to preclude the possibility that one or more other elements may exist or may be added.

Throughout the specification, when one member is positioned "on" another member, this includes not only the case where one member is in contact with the other member but also another member between the two members.

The terms first, second, etc. are used to distinguish one component from another component, and the component is not limited by the terms described above. An expression used in the singular encompasses the expression of the plural, unless it has a clearly different meaning in the context.

The reference numerals used in operations are used for descriptive convenience and are not intended to describe the order of operations and the operations may be performed in a different order unless otherwise stated.

FIG. 1 illustrates a vehicle system to which an electronic parking brake system according to an embodiment is applied.

Referring to FIG. 1, a vehicle may include an electronic brake system 10 and an electronic parking brake system 20.

The electronic brake system 10 includes a wheel speed sensor provided on each of the front and rear wheels to detect the speed of each wheel, and a longitudinal acceleration sensor provided on the vehicle to detect the longitudinal acceleration of the vehicle, and may be a system that brakes a vehicle by operating a brake device using each wheel speed sensor signal and a longitudinal acceleration signal.

For example, the electronic brake system 10 may be an anti-lock braking system (ABS) capable of temporarily releasing the braking of a wheel in response to a slip of a wheel detected when the vehicle is braking. In addition, the electronic brake system 10 is an electronic stability control (ESC) capable of selectively releasing the braking of the wheel in response to oversteering and/or understeering detected during steering of the vehicle. Further, the electronic brake system 10 may be a traction control system (TCS) capable of temporarily braking a wheel in response to a slip of a wheel detected when the vehicle is driven.

On the other hand, in addition to the electronic brake system 10, each wheel speed sensor and a longitudinal acceleration sensor are included, and a system using each wheel speed sensor signal and a longitudinal acceleration signal can be replaced.

The electronic parking brake system 20 may communicate with each other through the electronic brake system 10 and a vehicle communication network NT. For example, systems send and receive data through Ethernet, Media Oriented Systems Transport (MOST), Flexray, Controller Area Network (CAN), and Local Interconnect Network (LIN).

Figure 2:
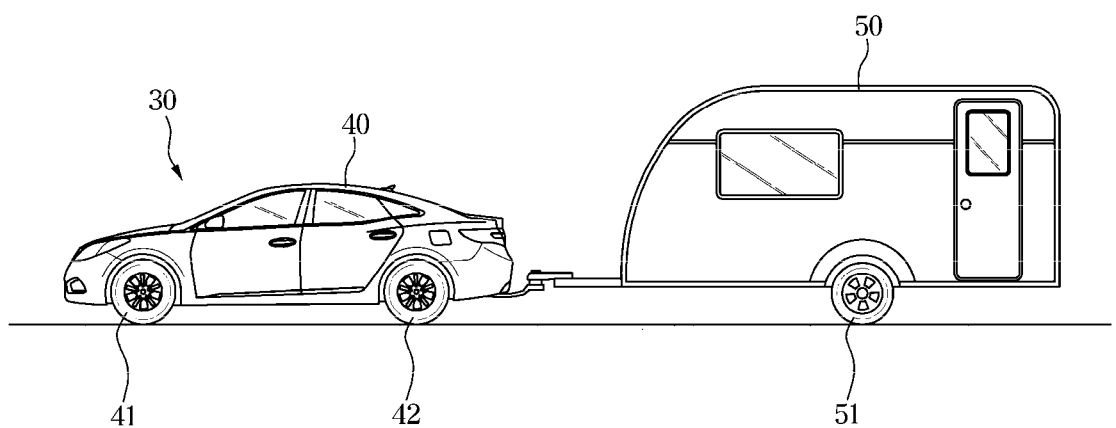
FIG. 2 is a diagram showing a vehicle equipped with a trailer connected to a towing vehicle to which an electronic parking brake system is applied according to an embodiment.

FIG. 2 is a diagram showing a vehicle equipped with a trailer connected to a towing vehicle to which an electronic parking brake system is applied according to an embodiment.

Referring to FIG. 2, the trailer mounted vehicle 30 may include a towing vehicle 40 and a trailer 50 mounted to the towing vehicle by a mounting device.

The towing vehicle 40 may include a pair of front wheels 41 and a pair of rear wheels 42.

The trailer 50 may include a pair of trailer wheels 51 connected to a trailer axle.

The trailer 50 may be mounted or detached from the towing vehicle 40 in the trailer mounted vehicle 30.

The electronic parking brake system 20 may park and brake at least one of the front wheels 41 and the rear wheels 42 of the towing vehicle 40.

Figure 3:
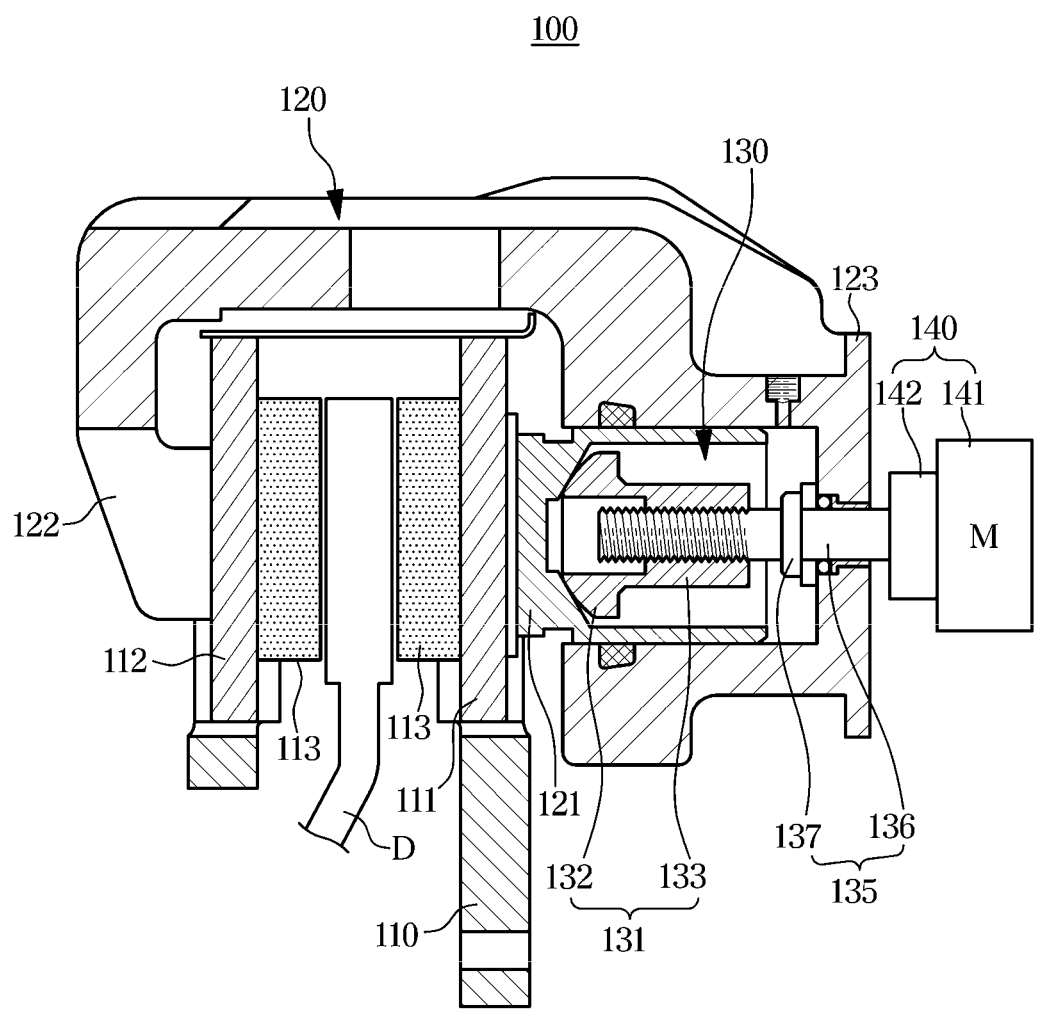
FIG. 3 illustrates a configuration of an electronic parking brake (EPB) applied to the electronic parking brake system according to an embodiment.

FIG. 3 illustrates a configuration of an electronic parking brake (EPB) applied to the electronic parking brake system according to an embodiment.

Referring to FIG. 3, the electronic parking brake 100 may include a carrier 110 in which a pair of pad plates 111 and 112 are installed to move forward and backward to pressurize the brake disk D rotating together with the vehicle wheel, a caliper housing 120 provided with a cylinder 123 that is slidably installed on the carrier 110 and in which the piston 121 is installed to advance and retreat by braking hydraulic pressure, a power conversion unit 130 that pressurizes the piston 121, and a motor actuator 140 that transmits rotational force to the power conversion unit 130 using a motor (M).

The pair of pad plates 111 and 112 is divided into an inner pad plate 111 disposed to contact the piston 121 and an outer pad plate 112 disposed to contact the finger portion 122 of the caliper housing 120. The pair of pad plates 111 and 112 are installed on the carrier 110 fixed to the vehicle body so as to advance and retreat toward both sides of the brake disk D. In addition, a brake pad 113 is attached to one surface of each of the pad plates 111 and 112 facing the brake disk D.

The caliper housing 120 is slidably installed on the carrier 110. The caliper housing 120 may include a cylinder 123 in which the power conversion unit 130 is installed at the rear portion thereof and the piston 121 is capable of moving forward and backward, and a finger portion 122 formed to be bent in a downward direction to operate the outer pad plate 112 in the front portion. The finger portion 122 and the cylinder 123 are formed integrally.

The piston 121 is provided in a cylindrical shape having a cup shape and is inserted into the cylinder 123 so as to be slidable. The piston 121 presses the inner pad plate 111 toward the brake disk D by the axial force of the power conversion unit 130 receiving the rotational force of the motor actuator 140. Accordingly, when the axial force of the power conversion unit 130 is applied, the piston 121 advances toward the inner pad plate 111 to press the inner pad plate 111, and the caliper housing 120 operates in a direction opposite to the piston 121 by reaction force, so that the finger portion 122 presses the outer pad plate 112 toward the brake disk D to perform braking.

The power conversion unit 130 may serve to press the piston 121 toward the inner pad plate 111 by receiving rotational force from the motor actuator 140. The power conversion unit 130 may include a nut member 131 installed so as to be disposed in the piston 121 and in contact with the piston 121, and a spindle member 135 screwed to the nut member 131.

The nut member 131 may be disposed in the piston 121 in a state in which rotation is restricted, and may be screwed with the spindle member 135.

The nut member 131 may be formed by a head portion 132 provided to come into contact with the piston 121, and a coupling portion 133 formed extending from the head portion 132 and having a female thread formed on the inner circumferential surface to be screwed with the spindle member 135.

The nut member 131 may move in a forward direction or a backward direction according to the rotation direction of the spindle member 135 and may serve to pressurize and release the piston 121. In this case, the forward direction may be a moving direction in which the nut member 131 approaches the piston 121. The reverse direction may be a direction in which the nut member 131 moves away from the piston 121. In addition, the forward direction may be a moving direction in which the piston 121 approaches the brake pad 113. The reverse direction may be a direction in which the piston 121 moves away from the brake pad 113.

The spindle member 135 may include a shaft portion 136 that penetrates the rear portion of the caliper housing 120 and rotates by receiving the rotational force of the motor actuator 140, and a flange portion 137 extending in the radial direction from the shaft portion 136. One side of the shaft portion 136 may be rotatably installed through the rear side of the cylinder 123, and the other side may be disposed in the piston 121. At this time, one side of the shaft portion 136 passing through the cylinder 123 is connected to the output shaft of the reducer 142 to receive the rotational force of the motor actuator 140.

The motor actuator 140 may include an electric motor 141 and a reducer 142.

The electric motor 141 may pressurize or release the piston 121 by moving the nut member 131 forward and backward by rotating the spindle member 135.

The reducer 142 may be provided between the output side of the electric motor 141 and the spindle member 135.

By having the above configuration, the electronic parking brake 100 may press the piston 121 by moving the nut member 131 by rotating the spindle member 135 in one direction using the motor actuator 140 in the parking operation mode. The piston 121 pressed by the movement of the nut member 131 presses the inner pad plate 111 to bring the brake pad 113 into close contact with the brake disk D, thereby generating a clamping force.

In addition, the electronic parking brake 100 rotates the spindle member 135 in the opposite direction using the motor actuator 140 in the parking release mode, so that the nut member 131 pressed against the piston 121 may move backward. The pressure on the piston 121 may be released by the retreat movement of the nut member 131. When the pressure on the piston 121 is released, the clamping force generated by the brake pad 113 being separated from the brake disk D may be released.

Figure 4:
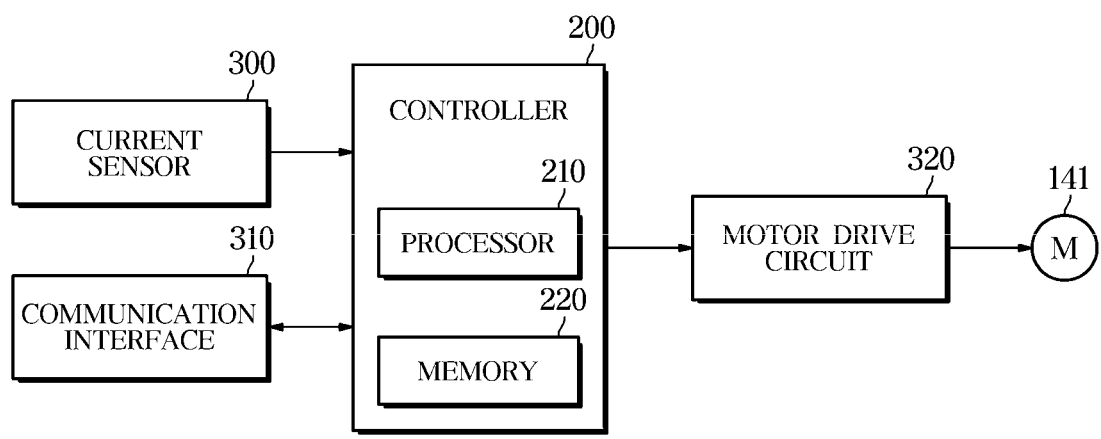
FIG. 4 illustrates s a control block of an electronic parking brake system according to an embodiment.

FIG. 4 illustrates a control block of an electronic parking brake system according to an embodiment.

Referring to FIG. 4, the electronic parking brake system 20 may include a controller 200 that performs overall control related to the operation of the electronic parking brake 100.

The current sensor 300 may be electrically connected to the input side of the controller 200.

The communication interface 310 may be electrically connected to the input/output side of the controller 200.

The motor driving circuit 320 may be electrically connected to the output side of the controller 200.

The current sensor 300 may detect a current flowing through the electric motor 141. For example, the current sensor 300 may detect a motor current flowing through the electric motor 141 using a shunt resistor or a Hall sensor. In addition to the shunt resistance or the Hall sensor, the current sensor 300 may use various methods capable of detecting motor current. The current sensor 300 may transmit the detected current information to the controller 200.

The communication interface 310 may exchange communication signals with the electronic brake system 10 through a vehicle communication network NT. The communication interface 310 may include a CAN transceiver.

Communication interface 310 may receive left front wheel speed, right front wheel speed, left rear wheel speed and right rear wheel speed from left front wheel speed sensor and right front wheel speed sensor provided on the front wheel side, the left rear wheel speed sensor provided on the rear wheel from the electronic brake system 10 of towing vehicle 40 of the trailer mounted vehicle 30.

The communication interface 310 may receive the longitudinal acceleration of the towing vehicle detected by the longitudinal acceleration sensor provided in the towing vehicle 40 of the trailer-equipped vehicle 30 from the electronic brake system 10.

The communication interface 310 may transmit the received left front wheel speed, right front wheel speed, left rear wheel speed, and right rear wheel speed to the controller 200.

The communication interface 310 may transmit the received longitudinal acceleration to the controller 200.

The motor driving circuit 320 may rotate the electric motor 141 forward or reverse. For example, the motor driving circuit 320 may include an H-Bridge circuit composed of a plurality of power switching elements to rotate the electric motor 141 forward and backward. During parking operation in which the electric motor 141 rotates in one direction by the motor driving circuit 320, the one-way rotation of the electric motor 141 is decelerated while passing through the reducer 142 to rotate the spindle member 135 in one direction with a large force. When the spindle member 135 rotates in one direction, the nut member 131 may be moved in the axial direction. When the nut member 131 presses the piston 121, the two brake pads 113 press the brake disk D so that the wheel may be braked. Parking deactivation can be operated in reverse to parking deactivation.

The controller 200 may be referred to as an ECU (Electronic Control Unit).

The controller 200 may include a processor 210 and a memory 220.

The memory 200 may store a program for processing or controlling the processor 210 and various data for operating the electronic parking brake system.

The memory 220 includes not only volatile memories such as S-RAM and D-RAM, but also includes a non-volatile memory such as flash memory, Read Only Memory (ROM), and Erasable Programmable Read Only Memory (EPROM).

The processor 210 may control the overall operation of the electronic parking brake system 30.

The controller 200 having the above configuration may rotate the electric motor 141 forward or reverse through the motor driving circuit 320.

The controller 200 may perform a parking operation mode or a parking release mode by an operation signal of a parking switch operated by a driver or an operation signal generated by a program related to an electronic parking brake operation.

The controller 200 can perform a parking operation in which the electric motor 141 is rotated in one direction to move the nut member 131 in the forward direction to press the piston 121 and the brake pad 113 is in close contact with the brake disk D to generate a clamping force (Parking Apply) in parking operation mode.

The controller 200 may perform a parking operation in which the electric motor 141 is rotated in the opposite direction to move the nut member 131 in the reverse direction and the piston 121 is depressurized to release the brake pad 113 in close contact with the brake disk D to perform a parking release (Parking Release) in the parking release mode to release the generated clamping force.

The controller 200 may determine a clamping force required for parking, determine a target current according to the determined clamping force, and control the electric motor 141 according to the determined target current.

The controller 200 receives front wheel speed (left front wheel speed, right front wheel speed) of towing vehicle 40 and longitudinal acceleration of towing vehicle 40, and determines whether the trailer 50 is mounted on the towing vehicle 40 based on changes in front wheel speed, rear wheel speed, and longitudinal acceleration received when the towing vehicle 40 passes through the speed bump.

The controller 200 may determine a clamping force required for parking according to whether or not the trailer 50 is mounted during parking operation.

The controller 200 may control the electronic parking brake 100 to generate the determined clamping force.

The controller 200 may determine whether a first trailer mounting condition in which disturbance occurs in at least one of the received front wheel speed and rear wheel speed when the towing vehicle 40 passes through the speed bump is satisfied.

The controller 200 may determine whether the front wheel disturbance and the rear wheel disturbance occur based on the received front wheel speed and rear wheel speed.

The controller 200 compares the speed of the front wheel and the speed of the rear wheel, and if the rate of change of the front wheel speed is higher than a threshold value than the rate of change of the rear wheel speed, it may determine that a disturbance has occurred in the speed of the front wheel. The controller 200 may determine that a disturbance has occurred in the rear wheel speed when the rear wheel speed change rate is higher than the threshold value than the front wheel speed change rate.

Figure 5:
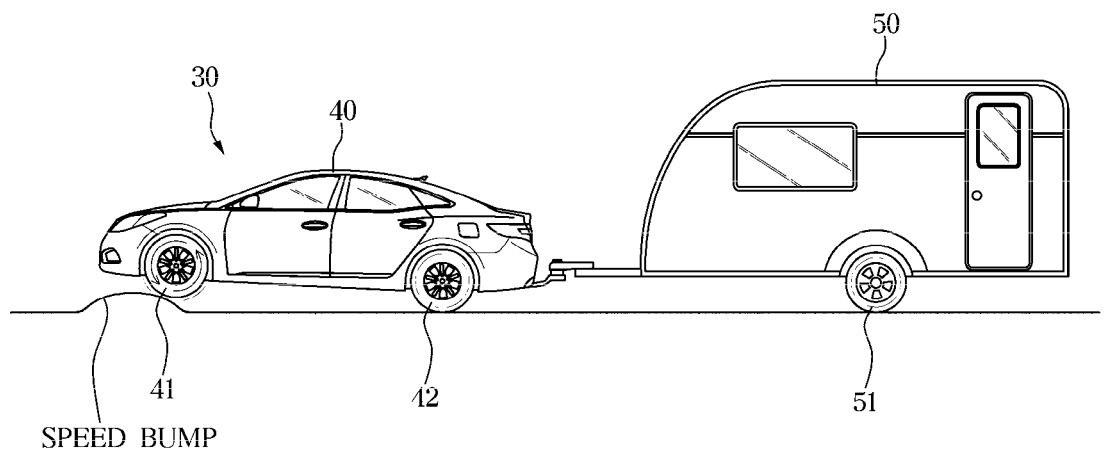
FIG. 5 is a diagram illustrating the front wheel of a vehicle equipped with a trailer connected to a towing vehicle to which an electronic parking brake system is applied according to an embodiment passes through a speed bump.

When the rate of change of the front wheel speed is higher than a preset value, the controller 200 may determine that a disturbance has occurred in the front wheel speed. This phenomenon may occur when the front wheel 41 of the towing vehicle 40 crosses the speed bump (see FIG. 5). When the front wheel 41 of the towing vehicle 40 crosses the speed bump, disturbance may occur in the front wheel speed.

Figure 6:
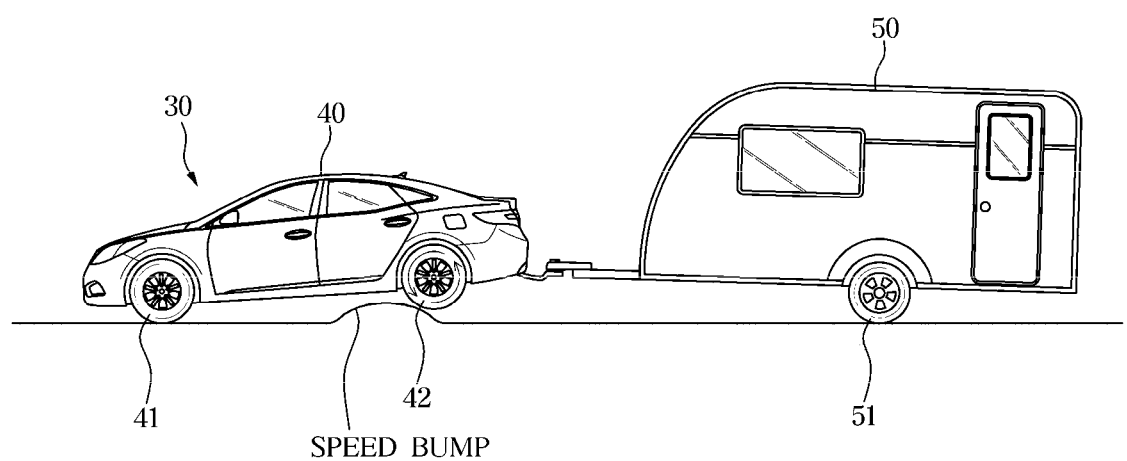
FIG. 6 is a diagram illustrating a rear wheel of a vehicle equipped with a trailer connected to a towing vehicle to which an electronic parking brake system is applied according to an embodiment passes through a speed bump.

When the rate of change of the rear wheel speed is higher than a preset value, the controller 200 may determine that a disturbance has occurred in the rear wheel speed. This phenomenon may occur when the rear wheel 42 of the towing vehicle 40 crosses the speed bump (see FIG. 6). When the rear wheel of the towing vehicle 40 crosses the speed bump, disturbance may occur in the rear wheel speed.

The controller 200 may determine whether the towing vehicle 40 passes through the speed bump based on the time when the front wheel disturbance occurs and the time when the rear wheel disturbance occurs. When the time interval from the time when the front wheel disturbance occurs to the time when the rear wheel disturbance occurs is the time interval when the front wheel 41 and the rear wheel 42 of the towing vehicle 40 pass the speed bump, the controller 200 may determine that the towing vehicle 40 passes through the speed bump. The time interval when the towing vehicle 40 passes the speed bump can be determined based on the traveling speed of the towing vehicle 40 and the distance between the front and rear axles.

The controller 200 can determine whether a front wheel disturbance or a rear wheel disturbance occurs based on the front wheel speed and the rear wheel speed when the towing vehicle 40 passes the speed bump.

Figure 7:
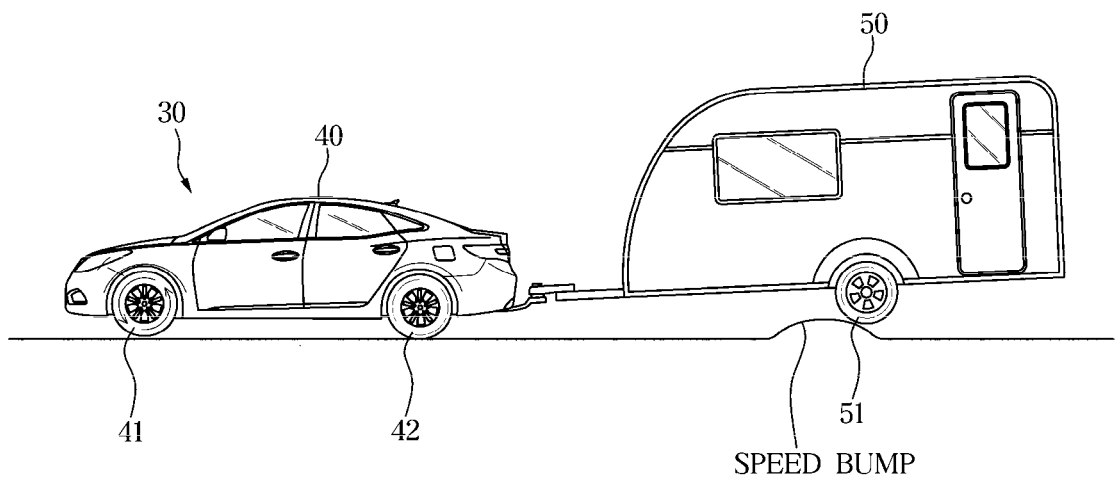
FIG. 7 is a diagram illustrating a trailer of a vehicle equipped with a trailer connected to a towing vehicle to which an electronic parking brake system is applied according to an embodiment passes through a speed bump.
Figure 8:
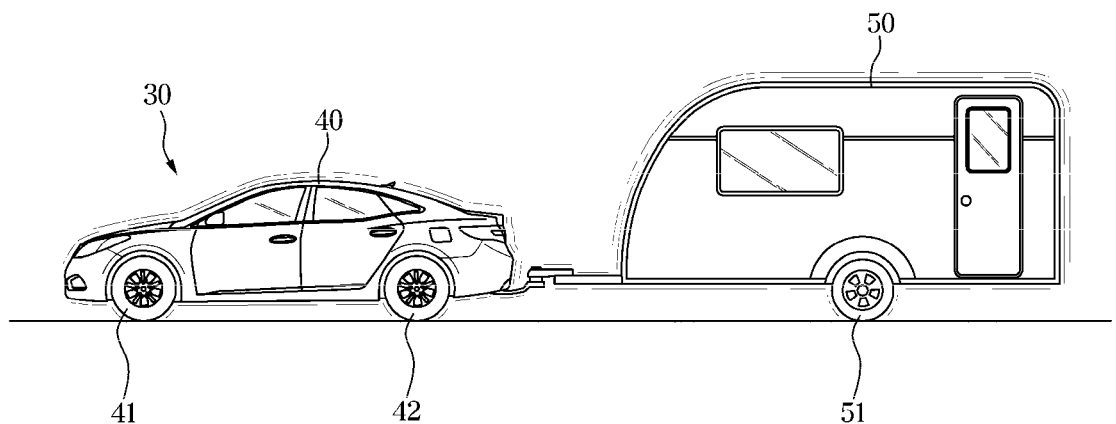
FIG. 8 is a diagram illustrating a case where a trailer-equipped vehicle to which a trailer is connected to a towing vehicle to which an electronic parking brake system is applied according to an embodiment stops.

The controller 200 may determine whether the first trailer mounting condition in which the front wheel disturbance or the rear wheel disturbance occurs when the towing vehicle 40 passes the speed bump is satisfied. The controller 200 may determine whether the first trailer mounting condition in which the front wheel disturbance or the rear wheel disturbance occurs within a preset time after both the front wheels 41 and the rear wheels 42 of the towing vehicle 40 pass through the speed bump. At this time, from the starting point of the time when the rear wheel disturbance occurred while both the front wheels 41 and the rear wheels 42 of the towing vehicle 40 passed the speed bump, within a preset time determined based on the driving speed of the towing vehicle 40 and the distance between the rear axle of the towing vehicle 40 and the trailer wheel axle, when at least one of the front wheel disturbance and the rear wheel disturbance occurs, the controller 200 may determine that the first trailer mounting condition has been satisfied. When both the front wheels 41 and the rear wheels 42 of the towing vehicle 40 have passed the speed bump, the occurrence of front wheel disturbance or rear wheel disturbance within a preset time is determined to be caused by the process of the trailer 50 crossing the speed bump. Therefore, it can be determined that there is a high possibility that the trailer 50 is mounted on the towing vehicle 40 (see FIG. 7).

When the controller 200 satisfies the first trailer mounting condition, it may be determined that the trailer 50 is mounted on the towing vehicle 40.

Meanwhile, the controller 200 may determine whether the second trailer mounting condition in which shaking occurs based on the longitudinal acceleration received by the towing vehicle 40 when the towing vehicle 40 passes the speed bump is satisfied.

The controller 200 may determine whether vehicle shake occurs based on the received longitudinal acceleration.

The controller 200 may determine that shaking has occurred in the towing vehicle 40 when the rate of change of the longitudinal acceleration is higher than a preset value. This phenomenon may occur when the wheel of the towing vehicle 40 crosses the speed bump (see FIGS. 5 and 6). When the front wheel 41 or the rear wheel 42 of the towing vehicle 40 crosses the speed bump, the longitudinal acceleration change rate may be higher than a preset value.

Based on the time when the first shake, which is the first vehicle shake, and the second shake, which is the second vehicle shake, the controller 200 can determine whether the towing vehicle 40 passes the speed bump. When the time interval from the time when the first shaking occurs to the time when the second shaking occurs is the time interval between the front wheels 41 and the rear wheels 42 of the towing vehicle 40 passing the speed bump, the controller 200 indicates that the towing vehicle 40 speeds. It can be determined as passing through the bump. The time interval when the towing vehicle 40 passes the speed bump can be determined based on the traveling speed of the towing vehicle 40 and the distance between the front and rear axles.

The controller 200 may determine that the front wheel 41 and the rear wheel 42 of the towing vehicle 40 pass the speed bump using the front wheel disturbance and the rear wheel disturbance instead of the vehicle shaking.

The controller 200 may determine whether towing vehicle 40 is shaken when the towing vehicle 40 passes the speed bump.

The controller 200 may determine whether the towing vehicle 40 satisfies the second trailer mounting condition in which vehicle shaking occurs when passing through the speed bump. The controller 200 may determine whether the second trailer mounting condition in which the vehicle shake occurs within a preset time after both the front wheels 41 and the rear wheels 42 of the towing vehicle 40 pass through the speed bump. At this time, in a state in which both the front wheels 41 and the rear wheels 42 of the towing vehicle 40 have passed the speed bumps, from the time when the vehicle shake occurs when the rear wheel 42 of the towing vehicle 40 passes through the speed bump, when the vehicle shake occurs within a preset time determined based on the driving speed of the towing vehicle 40 and the distance between the rear axle of the towing vehicle 40 and the trailer wheel axle, the controller 200 may determine that the second trailer mounting condition has been satisfied. With both the front wheels 41 and the rear wheels 42 of the towing vehicle 40 passing through the speed bump, the occurrence of vehicle shaking within a preset time may be determined to be caused in the process of the wheel 51 of the trailer 50 crossing the speed bump. Therefore, it can be determined that there is a high possibility that the trailer 50 is mounted on the towing vehicle 40 (see FIG. 7).

When the controller 200 satisfies the second trailer mounting condition, it may be determined that the trailer 50 is mounted on the towing vehicle 40.

When both the first trailer mounting condition and the second trailer mounting condition are satisfied, the controller 200 may determine that the trailer 50 is mounted on the towing vehicle 40.

Meanwhile, the controller 200 may determine whether the towing vehicle 40 satisfies the third trailer mounting condition in which shaking based on the longitudinal acceleration occurs when the towing vehicle 40 stops. The controller 200 may determine that there is a high possibility that the trailer 50 is mounted on the towing vehicle 40 when the towing vehicle 40 is shaken when the towing vehicle 40 stops. In general, the trailer 50 is provided with an inertial brake for braking the trailer wheel 51 by the tensile force of a wire connected to the trailer wheel 51. When the trailer 50 is mounted on the towing vehicle 40, the inertia brake of the trailer 50 is operated when the towing vehicle 40 stops, and the towing vehicle 40 is shaken based on the longitudinal acceleration due to the deceleration of the trailer 50. In this way, when the vehicle shake occurs when the towing vehicle 40 stops, it can be determined that the possibility that the trailer 50 is mounted on the towing vehicle 40 is high.

In a state in which the first trailer mounting condition is satisfied, the second trailer mounting condition is satisfied, or both the first trailer mounting condition and the second trailer mounting condition are satisfied, If the third trailer mounting condition is satisfied, it may be determined that the trailer 50 is mounted on the towing vehicle 40. That is, by satisfying at least one of the first trailer mounting condition and the second trailer mounting condition, If it is highly possible that the trailer 50 is mounted on the towing vehicle 40 and the third trailer mounting condition is additionally satisfied, it can be confirmed that the trailer 50 is mounted on the towing vehicle 40.

Figure 9:
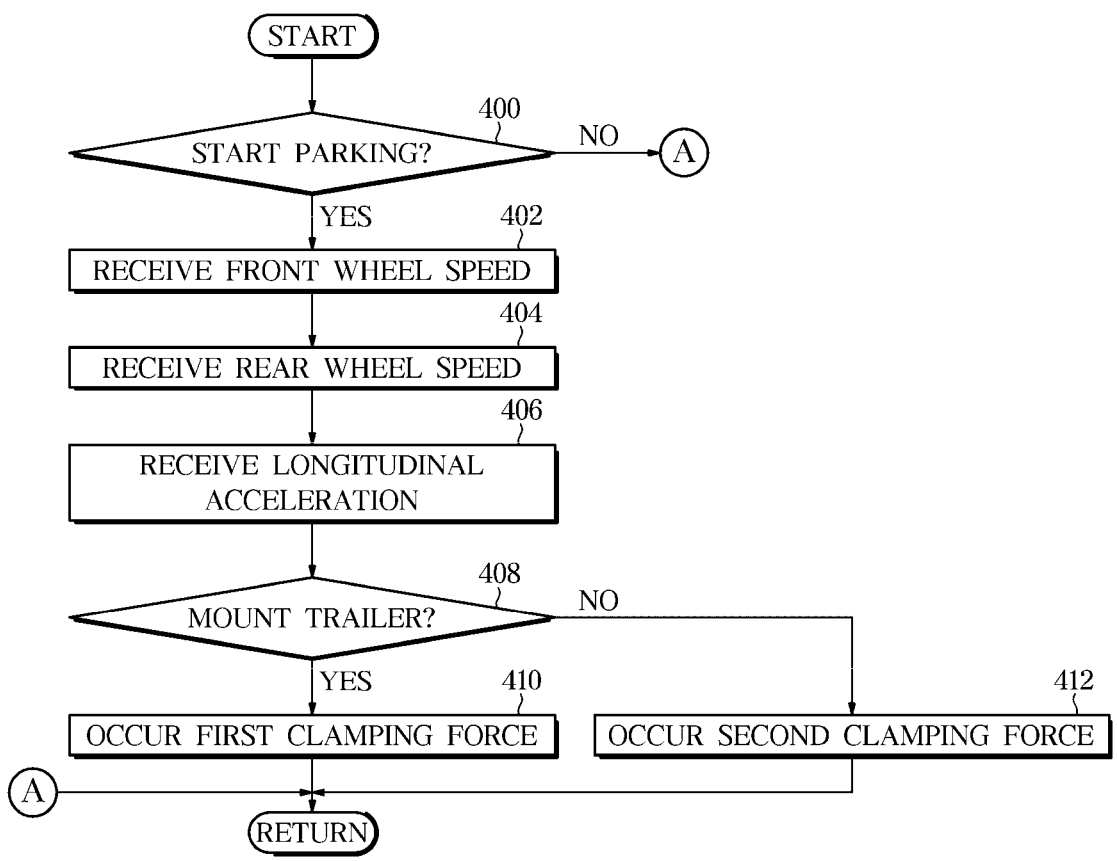
FIG. 9 illustrates a method of controlling an electronic parking brake system according to an embodiment.

FIG. 9 illustrates a method of controlling an electronic parking brake system according to an embodiment.

Referring to FIG. 9, the controller 200 may determine whether the parking operation is started (400). In this case, when the parking switch is turned on, the controller 200 may determine that the parking operation is started.

As a result of the determination of the operation mode 400, if the parking operation is started, the controller 200 may receive front wheel speed, rear wheel speed and longitudinal acceleration (402, 404, 406).

The controller 200 may determine whether the trailer 50 is mounted on the towing vehicle 40 based on the received front wheel speed, rear wheel speed, and longitudinal acceleration (408).

If it is determined that the trailer 50 is mounted on the towing vehicle 40 as a result of the determination of the operation mode 408, the controller 200 determines the clamping force required for parking as the first clamping force based on the maximum weight (GCVW) of the trailer-equipped vehicle 30 mounted on the trailer 50 to the towing vehicle 40, thereby generating the first clamping force.

On the other hand, if it is determined that the trailer 50 is not mounted on the towing vehicle 40 as a result of the determination of the operation mode 408, based on the maximum weight (GVW) of the towing vehicle 40, which is lighter than the maximum weight of the trailer-equipped vehicle 30 (GCVW) (for example, the maximum weight of the towing vehicle 40 minus the weight of the trailer 40 from the maximum weight of the trailer-equipped vehicle 30), the controller 200 may generate a second clamping force by determining the clamping force required for parking as a second clamping force reduced than the first clamping force (412).

Accordingly, the electronic parking brake system according to an embodiment can prevent excessive design by appropriately varying the clamping force required for parking according to whether or not a trailer is mounted, thereby reducing manufacturing cost and improving durability.

Figure 10:
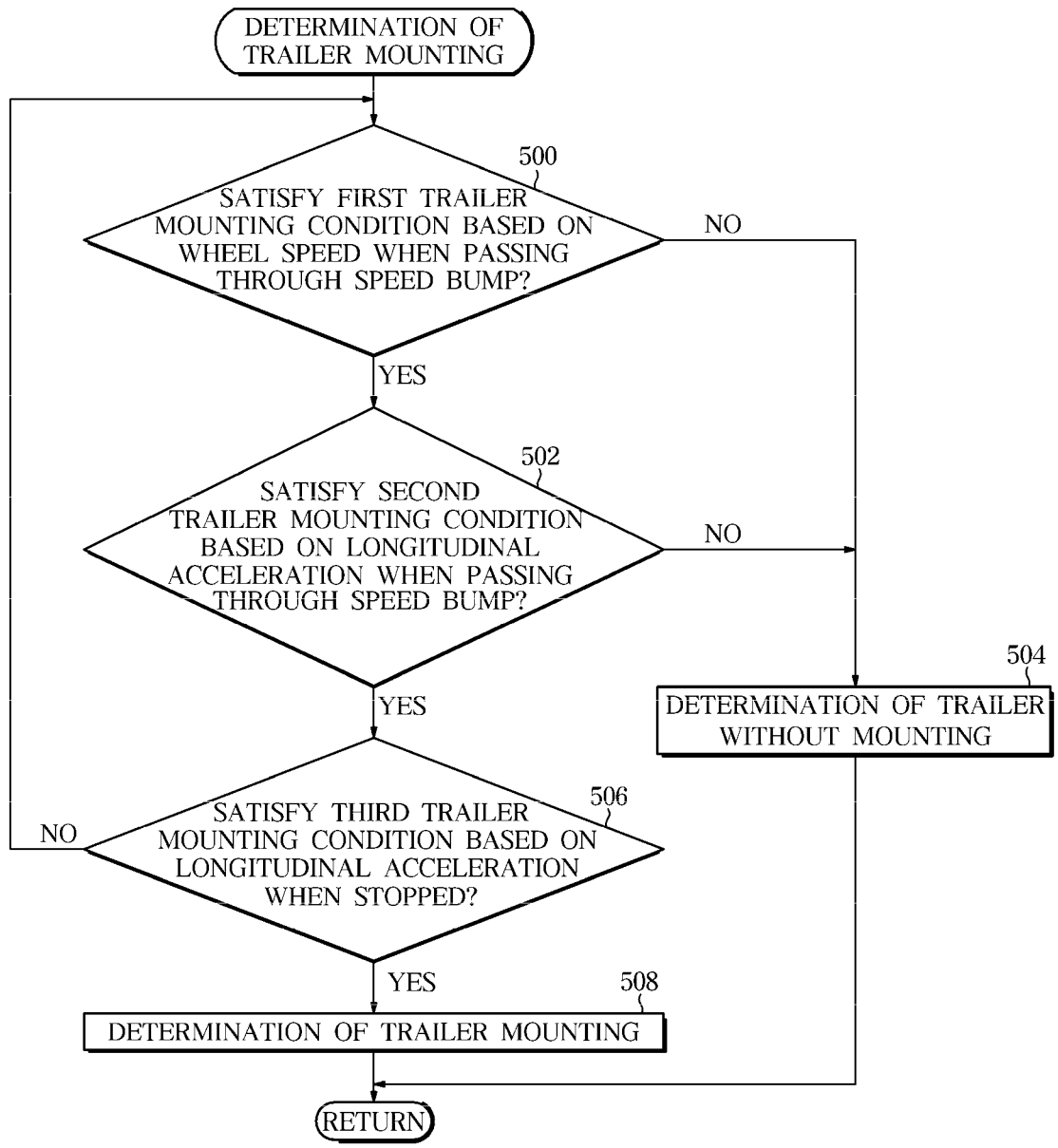
FIG. 10 is a diagram illustrating determining whether a trailer is mounted in the electronic parking brake system according to an embodiment.

FIG. 10 is a diagram illustrating determining whether a trailer is mounted in the electronic parking brake system according to an embodiment.

Referring to FIG. 10, when the towing vehicle 40 passes through the speed bump, it may be determined whether the first trailer mounting condition based on the wheel speed of the towing vehicle 40 is satisfied (500).

If, as a result of determining the operation mode 500, the first trailer mounting condition is satisfied, the controller 200 may determine whether the second trailer mounting condition based on the longitudinal acceleration of the towing vehicle 40 is satisfied when the towing vehicle 40 passes the speed bump. (502).

On the other hand, if the determination result of the operation mode 500 does not satisfy the first trailer mounting condition, or the determination result of the operation mode 502 does not satisfy the second trailer mounting condition, it may be determined that the towing vehicle 40 is not mounted on the trailer 50 (504).

If, as a result of determining the operation mode 502, the second trailer mounting condition is satisfied, the controller 200 may determine whether the third trailer mounting condition based on the longitudinal acceleration when the towing vehicle 40 stops (506).

If, as a result of determining the operation mode 506, the third trailer mounting condition is not satisfied, the controller 200 may move to the operation mode 500 and perform the following operation modes.

On the other hand, if the determination result of the operation mode 506 satisfies the third trailer mounting condition, the controller 200 may determine that the trailer 50 is mounted on the towing vehicle 40 (508).

The controller 200 and the communication interface 310 of the disclosed invention may be implemented as a software module. The controller 200 and the communication interface 310 may be mounted in the ECU of the electronic brake system 10 in the form of software. When at least one of the controller 200 and the communication interface 310 is implemented as a software module, the software module may be stored in a computer-readable non-transitory computer readable media. Further, at least one software module may be provided by an operating system (OS) or may be provided by a predetermined application. In addition, some of the at least one software module may be provided by an operating system (OS), and the remaining part may be provided by a predetermined application.

The disclosed invention can be implemented as a computer-readable code in a medium on which a program is recorded. The computer-readable medium may include all types of recording devices that store data that can be read by a computer system. Examples of computer-readable media include HDD (Hard Disk Drive), SSD (Solid State Disk), SDD (Silicon Disk Drive), ROM, RAM, CD-ROM, magnetic tape, floppy disk, optical data storage device, etc.

According to an aspect of the present disclosure, by appropriately varying the clamping force required for parking according to whether or not a trailer is mounted, excessive design can be prevented, thereby reducing manufacturing cost and improving durability.

What is claimed is:

1. An electronic parking brake system that generates a clamping force required for parking of trailer-mounted towing vehicles, the electronic parking brake system comprising:
   an electronic parking brake provided on at least one of front and rear wheels of the towing vehicle; and
   a controller configured to
      receive a front wheel speed, a rear wheel speed, and a longitudinal acceleration of the towing vehicle,
      determine whether or not the trailer is mounted based on changes in the received front wheel speed, rear wheel speed, and longitudinal acceleration when the towing vehicle passes a speed bump,
      determine the clamping force required for parking according to whether or not the trailer is mounted when parking is operated, and
      control the electronic parking brake to generate the determined clamping force,
   wherein the controller is configured to
      check a first condition in which a front wheel disturbance or a rear wheel disturbance occurs within a first preset time after both the front and rear wheels of the towing vehicle pass through the speed bump, the first preset time being measured from a time when an initial rear wheel disturbance occurs and from a first driving speed of the towing vehicle and a first distance between a rear wheel axle of the towing vehicle and a trailer wheel axle of the trailer, wherein the front wheel disturbance or the rear wheel disturbance is determined based on at least one of the received front wheel speed and the received rear wheel speed,
      check a second condition in which a first vehicle shaking occurs in the towing vehicle within a second preset time after both the front and rear wheels of the towing vehicle pass through the speed bump, wherein the first vehicle shaking is determined based on the longitudinal acceleration when the towing vehicle passes the speed bump,
      determine whether a third condition in which a second vehicle shaking occurs when the towing vehicle stops, is satisfied, when both the first trailer mounting condition and the second trailer mounting condition are satisfied, wherein the second vehicle shaking is determined based on a longitudinal acceleration according to operating an inertia brake of the trailer mounted on the towing when the towing vehicle stops, and
      determine that the trailer is mounted on the towing in response to the first-third condition being satisfied.

2. The electronic parking brake system according to claim 1, wherein the controller is configured to determine whether the front and rear wheels of the towing vehicle pass through the speed bump based on a time interval between a time when an initial front wheel disturbance occurs in the received front wheel speed and the time when the initial rear wheel disturbance occurs in the received rear wheel speed.

3. The electronic parking brake system according to claim 1, wherein the second preset time is determined based on a second driving speed of the towing vehicle and a second distance between the rear wheel axle of the towing vehicle and the trailer wheel axle of the trailer.

4. The electronic parking brake system according to claim 3, wherein the controller is configured to determine whether the front and rear wheels of the towing vehicle pass through the speed bump based on a time interval between a time when one shaking of the towing vehicle occurs and a time when an other shaking of the towing vehicle occurs.

5. The electronic parking brake system according to claim 4, wherein the controller is configured to determine the second condition is satisfied in response to the first vehicle shaking occurring within the second preset time measured from a point of time where a shaking of the towing vehicle occurs when the rear wheel of the towing vehicle passes through the speed bump.

6. A control method of an electronic parking brake system that generates a clamping force required for parking of a trailer mounted towing vehicle, the control method comprising:
   receiving a front wheel speed, a rear wheel speed and a longitudinal acceleration of the towing vehicle,
   determining whether or not the trailer is mounted based on changes in the received front wheel speed, rear wheel speed, and longitudinal acceleration when the towing vehicle passes the speed bump,
   determining the clamping force required for parking according to whether or not the trailer is installed when parking is operated, and
   generating the determined clamping force by the electronic parking brake,
   wherein the determining whether or not the trailer is mounted comprises:
      checking a first condition in which a front wheel disturbance or a rear wheel disturbance occurs within a first preset time after both the front and rear wheels of the towing vehicle pass through the speed bump, the first preset time being measured from a time when an initial rear wheel disturbance occurs and determined based on a first driving speed of the towing vehicle and a first distance between a rear wheel axle of the towing vehicle and a trailer wheel axle of the trailer, wherein the front wheel disturbance or the rear wheel disturbance is determined based on at least one of the received front wheel speed and the received rear wheel speed,
      checking a second condition in which first vehicle shaking occurs in the towing vehicle within a second preset time after both the front and rear wheels of the towing vehicle pass through the speed bump, wherein the first vehicle shaking is determined based on the longitudinal acceleration when the towing vehicle passes the speed bump,
      determining whether a third condition in which second vehicle shaking occurs when the towing vehicle stops, is satisfied, when both the first trailer mounting condition and the second trailer mounting condition are satisfied, wherein the second vehicle shaking is determined based on a longitudinal acceleration according to operating an inertia brake of the trailer mounted on the towing when the towing vehicle stops, and
      determining that the trailer is mounted on the towing in response to the third condition being satisfied.

7. The method according to claim 6, wherein the determining whether or not the trailer is mounted comprises: determining whether the front and rear wheels of the towing vehicle pass through the speed bump based on a time interval between a time when an initial front wheel disturbance occurs in the received front wheel speed and the time when the initial rear wheel disturbance occurs in the received rear wheel speed.

8. The method according to claim 6, wherein the second preset time is determined based on a second driving speed of the towing vehicle and a second distance between the rear wheel axle of the towing vehicle and the trailer wheel axle of the trailer.

9. The method according to claim 8, wherein the determining whether or not the trailer is mounted comprises:
   determining whether the front and rear wheels of the towing vehicle pass through the speed bump based on a time interval between a time when one shaking of the towing vehicle occurs and a time when an other shaking of the towing vehicle occurs.

* * * * *